July 19, 1960  E. DE FILIPPO  2,945,532
METHOD AND APPARATUS FOR SPLICING ARTICLES
Filed Dec. 22, 1954

INVENTOR
Elio de Filippo

BY Stevens, Davis, Miller & Mosher
ATTORNEYS

United States Patent Office 2,945,532
Patented July 19, 1960

2,945,532
METHOD AND APPARATUS FOR SPLICING ARTICLES

Elio de Filippo, Milan, Italy, assignor to Pirelli S.p.A., Milan, Italy

Filed Dec. 22, 1954, Ser. No. 477,018

Claims priority, application Italy Dec. 30, 1953

10 Claims. (Cl. 154—9)

The present invention relates to a method and apparatus for splicing unvulcanized rubber articles and more particularly to a method and apparatus for joining together the ends of a length of tubular rubber stock and preferably synthetic rubber stock, to form an inner tube.

Heretofore, the practice of joining the ends of unvulcanized tube stock for the purpose of forming a finished tube was to flatten the end portions of the tubes and to clamp them between suitable clamping jaws, allowing a small excess of material to extend from the faces of the clamping jaws, to trim such excess and finally to move the jaws together to clamp the freshly cut ends of the tube stock to form a splice.

The trimming of stock before the ends are spliced together is the most delicate phase of this operation. It serves to obtain freshly cut surfaces which are therefore tacky and thus facilitates the adhesion of the ends by compression. There are two fundamental methods, presently employed in the industry, for trimming the stock.

The first method consists in trimming the ends of a tube stock according to the minor axis of the flattened tube section, by means of a knife which is suitably heated.

The physical characteristics of rubber compounds and particularly of synthetic rubber compounds, are such that the trimmed ends of the stock, when severed in the manner described, will have concave surfaces. In fact, the knives in trimming the end portions of the stock tend to deflect the two projecting ends of the stock and, as a result, some of the fibers will be stretched and others compressed. Upon completing the cut these fibers return to their normal position, thus imparting to the cut surfaces a concave profile.

Hence, as the clamping jaws are being moved together the various points of the freshly cut surfaces are not brought simultaneously into abutting engagement. This results in uneven resistances in all points of the splice, i.e. in the peripheral zone, wherein the contact was made first, there will be a greater toughness than in the central zone wherein the contact took place at a later time.

Another drawback encountered in connection with a concave profile of the abutting ends of the tube stock, is that resulting from the occlusion of air bubbles in the splice.

The various suggested methods to overcome these drawbacks have not been satisfactory and are open to the same objections.

The second method heretofore proposed consists in trimming the two end portions of a tube stock flush with the opposed faces of the clamping jaws, by means of a circular blade without leaving any projection. The clamping pressure is then increased from a certain value to a higher value which causes a certain amount of rubber to project from the clamping jaws. The two projecting surfaces are, obviously, imparted a convex profile.

One objection to this method is due to the fact that the projecting surfaces, obtained by compression of the end portions of the inner tube stock between the clamping jaws, are irregular and present a discontinuity along the line that separates the two walls of the tube, which have a tendency to spread out. When the two jaws move together, the interior parts of the walls of the tube section which have been projected out due to the increase of clamping pressure also come in contact. However, since the interior walls of the tube section are covered with talcum powder they are thereby prevented from being joined together. In this way only part of the thickness is utilized for the splice and the section of the inner tube is weakened in the zone of the finished splice.

A further defect resides in the fact that the elasticity of the compounds used for the manufacture of inner tubes, particularly compounds containing synthetic rubber, is such that the part of the tube which was forced to project from the clamping jaws tends to contract and return to its initial position when the spliced tube is removed from the clamp. Thus, in the very zone of the splice such contraction will have the tendency of further thinning the tube section until, in some cases, the joint even comes apart.

The object of the present invention is to provide a trimming method by means of suitably shaped knives which are advanced in the direction of the major axis of the flattened end portions of the tube to be spliced in order to obtain at the ends thereof, directly by cutting without additional operations, the profile that is considered the most likely to give the optimum results sought after in the subsequent forming of the splice. This method, moreover, avoids subjecting the end portions of the tube to excessively high pressures which, aside from the foregoing difficulties, are harmful in that they cause weakening of the two lateral zones of the flattened tube.

The method of this invention contemplates facilitating the trimming of the tube section when the flattened stock is urged toward the advancing trimming knives. It is thus possible to avoid the tendencies which would alter the ultimate form of the trimmed section as a result of deformation produced by the knives in the course of cutting.

By the method of the present invention it is possible to modify, at will, depending upon the characteristics of the various compounds, the profile of the cut section. Increase and decrease of the projection are obtained simply by varying the concaveness of the blade without modifying the clamping pressure.

The feature of applying constant pressure is important because the magnitude of clamping pressure has a direct bearing upon the successful formation of the splice. In fact, during the splicing operation the pressure exerted upon the two contacting surfaces tends to displace the two end portions of the tube with respect to the clamping means. This displacement, which occurs when the clamping pressure is insufficient, reduces the splicing pressure and, as a result, the splice will be weak and tend to come apart.

An excessive increase of the clamping pressure, on the other hand, will produce a thinning of the walls in the zone of the two lateral folds of the flattened ends of the tube. This thinning of the walls, with attendant drawbacks thereof, is aggravataed in the course of vulcanization to the point where the finished article must be discarded. The various embodiments of the method explained above constitute the main object of the present invention.

Other objects and advantages will become apparent from reading the following description taken in conjunction with the accompanying drawings, wherein.

Figure 1:
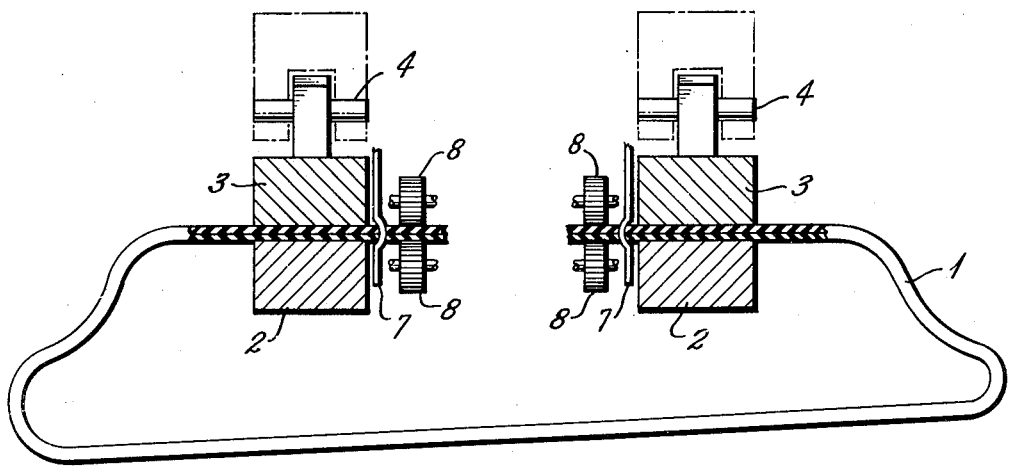
Figure 1 is a schematic representation illustrating in side elevational view two clamps and a trimming device according to the method of the present invention.
Figure 2:
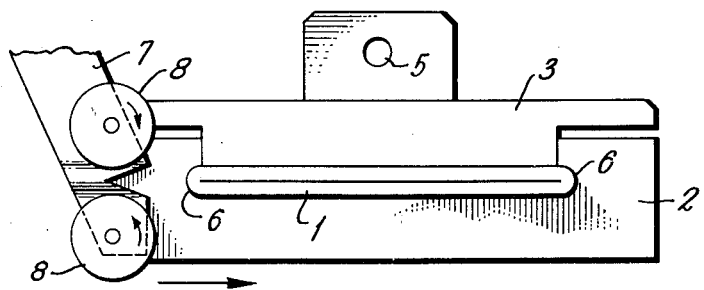
Figure 2 is a schematic representation illustrating in front elevational view one of the clamps and the trimming device.
Figure 3:
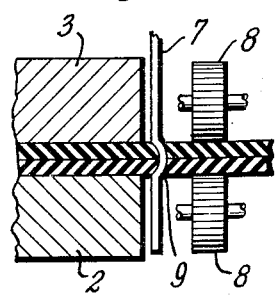
Figure 3 is a side view of one of the two clamps prior to the trimming operation.
Figure 5:
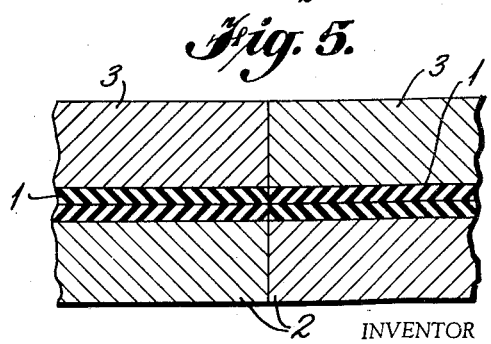
Figure 5 is a side view of the two contacting clamps during the splicing phase.

The method according to the present invention may be carried out by means of several devices. The essential parts of the preferred device incorporating the improvements constituting the present invention will be apparent from the description given hereinafter.

The means that control the movement of the various parts have been purposely omitted in the drawings and in the following description. It will be understood that various means may be provided for such purpose and only indirectly comprise a part of the invention. Further, these means will be well known to those skilled in the art from the following description.

The main operations executed in accordance with the method herein disclosed, are as follows:

Referring to Figures 1, 2, 3, 4 and 5, the two flattened end portions of the inner tube stock to be spliced are placed in the bottom parts of the clamping jaws 2 and are subjected to clamping pressure by means of the upper jaws 3.

The upper jaws are supported by a pin 4 inserted in aperture 5, which permits pivotal movement of the upper jaws traversely of the tube stock. By this arrangement, the jaws of the clamp will securely engage with the tube stock even under circumstances where the thickness of one is not uniform, i.e. thinner on one side.

The two lateral folds of the tube are accommodated in appropriate semi-cylindrical channels 6 which are provided for the purpose of protecting them from being crushed.

Upon closing the clamping jaws to clamp the end portions of the tube stock therebetween, the clamping pressure is maintained absolutely constant during all subsequent operations. The end portions extending from the faces of the jaws are then severed by means of a cutting or trimming device consisting of a pair of blades 7 and two pairs of small rollers 8, i.e. one blade 7 and one pair of rollers 8 cooperating with each clamp to enable simultaneous cutting of the two ends of the tube stock. The blades 7 are suitably heated to facilitate the cutting operation and to render the cut surfaces tacky. The blades and the rollers are mounted on a single carriage which is moved during the cutting operation in the direction of the arrow shown in Figure 2 and, when the cut is completed, returns to its initial position, thus permitting the clamps to move together preparatory to splicing the freshly cut ends of the tube stock.

Figure 4:
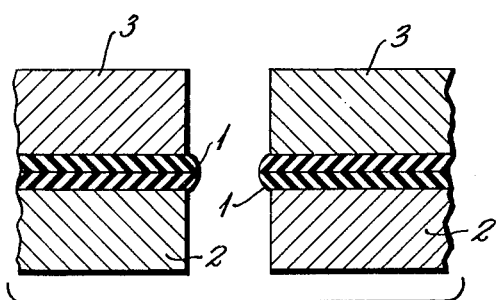
Figure 4 is a side view after the trimming operation.

The blades are shown as having a bowed configuration 9 in the cutting zone which determines the convexity of the trimmed section (see Figure 4). Moreover, the front part of the blades is formed as a V with its opening facing the tube to be cut. By this practice the cut will extend from the exterior to the interior and the cut surface will be more uniform as a result.

The rollers 8 are controlled and the movement thereof tends to urge the tube ends towards the blades. Their peripheral speed is correlated to the speed at which the blades advance with an excess of about 5% in favor of the rollers 8. It is specifically the effect of a difference in speed that urges the tube ends towards the blades. In this way the fibers of the tube stock, which are oriented in the direction in which the fibers are extruded and are thus perpendicularly disposed with respect to the advance of the blades, are caused to be bent whereas the blades tend to bend the fibers in the opposite direction.

Although the excess speed has been referred to as being about 5% in the preceding paragraph, it will be apparent that this particular figure only illustrates the novel concept herein taught. The optimum excess speed which will actually be employed will depend on the particular tube stock, clamp, knife, rollers, etc. being used. Such will be evident to one skilled in the art from the novel concepts herein taught.

As a result, the fibers are cut perpendicularly without being subjected to distortions and the surface of the cut is clean and uniform.

After the cut is completed, the carriage carrying the blades and the rollers returns to its original position and the clamping jaws are moved together. The two projecting ends of the tube are pressed together at a pressure which may vary according to the type of compound employed. The clamping contact is applied gradually, beginning with the interior part of the section and proceeding slowly towards the exterior.

By practicing the invention in the manner described, three important advantages are achieved. First, the interior parts which are not supported by the walls of the clamping jaws and are, therefore, more difficult to splice, now can be contacted first and are subjected from the beginning to the entire splicing pressure, which has the effect of improving the splice in the most dangerous or critical zone.

The second advantage afforded by this system is that of avoiding the inclusion of air bubbles between the spliced surfaces. At the same time it is possible to form a splice without any outside flash. The elimination of these two defects is important because the air bubbles are the cause of a breach of continuity in the splice which is perceived only upon vulcanization, whereas the outside flash folded upon the exterior surface of the tube, not having adhered thereto because of the presence of talcum gives rise to cuts after vulcanization which weaken the zone of the splice.

The third advantage of the system results from the fact that the two convex surfaces projecting from the clamping jaws do not cause a breach of continuity, since the clamping pressure in maintained constant throughout the entire operation and, therefore, the two portions of the tube do not have a tendency to thin or spread out. Thus, the two surfaces to be spliced upon being brought together are in a position shown in Figure 4, i.e. with both the upper and lower ends in perfect registry.

After being brought into abutting engagement, the clamping jaws are maintained clamped against each other for a period that varies according to the characteristics of the various compounds used for the inner tube stock. After the splice is completed, the upper jaws 3 are released and the spliced tube is removed.

In the foregoing description reference was made to splicing of natural or synthetic tubular rubber stock to form an innner tube. It will be readily apparent that the method is applicable to other articles of natural or synthetic rubber or compounds thereof without departing from the spirit and scope of the invention.

What is claimed is:

1. Method of joining the two ends of an unvulcanized inner tube which includes the steps of clamping the flattened ends of the tube in spaced relation under a pressure which remains constant duruing the successive steps and in a manner designed so that the ends project slightly beyond the area of clamping, cutting each of the projecting ends convexly in an area slightly beyond the area of the clamping, supporting each of the projecting ends during cutting on the opposite side of the cutting area from the clamping area and urging the so-supported projecting ends in a direction opposite to the direction of cutting, reciprocally moving the cut ends toward each other to bring same into intimate contact, applying pressure to the contacting cut ends to cause them to adhere, and releasing the clamped ends.

2. Method of joining the two ends of an unvulcanized inner tube which includes the steps of clamping the flattened ends of the tube in spaced relation under a pressure which remains constant during the successive steps and in a manner designed so that the ends project slightly beyond the area of clamping, cutting each of the projecting ends convexly in a direction parallel to the major axis of the flattened ends and in an area slightly beyond the area of clamping, supporting each of the projecting ends during cutting on the opposite side of its cutting area from its clamping area and urging the so-supported projecting ends in a direction opposite to the direction of cutting, reciprocally moving the cut ends toward each other to bring same into intimate contact, applying pressure to the contacting cut ends to cause them to adhere, and releasing the clamped ends.

3. Apparatus for trimming a piece of flexible stock and splicing the ends together comprising a pair of clamping means for holding the two ends of said stock in spaced relation under a constant pressure with the ends projecting slightly from the clamping means, knife blades mounted for reciprocal movement relative to said clamping means and each having a bow-shape in the cutting zone to impart to its respective cut end a convex configuration, means for moving said knife blades so as to provide said reciprocal movement therefor, means located on the opposite side of each knife blade from its associated clamping means and cooperating with said knife blades for supporting the ends during cutting and for urging the ends in the direction of said knife blades, and means for reciprocally moving said clamping means toward each other with the cut ends in registry to force the cut ends into abutting engagement and thereby form a splice.

4. Apparatus as defined in claim 3 wherein each said knife blade is characterized by a V-shaped leading edge so that it will cut the projecting ends from the exterior to the interior thereof.

5. Apparatus for trimming an unvulcanized inner tube and splicing the ends together comprising a pair of clamping means for holding the two flattened ends of said tube in spaced relation under a constant pressure with the ends of the tube projecting slightly from the clamping means, said clamping means defining semi-cylindrical channels for housing the two lateral folds of the flattened ends of said tube, heated knife blades mounted for reciprocal movement relative to said clamping means and each having a bow-shape in the cutting zone to impart to its respective cut end a convex configuration, means located on the opposite side of each knife blade from its associated clamping means and cooperating with said knife blades for supporting the ends during cutting and for urging the ends in the direction of said knife blades, and means for reciprocally moving said clamping means toward each other with the cut ends in registry to force the cut ends into abutting engagement and thereby form a splice.

6. Apparatus for trimming an unvulcanized inner tube and splicing the ends together comprising a pair of clamping means for holding the two flattened ends of said tube in spaced relation under a constant pressure with the ends of the tube projecting slightly from the clamping means, said clamping means defining semi-cylindrical channels for housing the lateral folds of the flattened ends of said tube, heated knife blades mounted for reciprocal movement relative to said clamping means and each having a bow-shape in the cutting zone to impart to its respective cut end a convex configuration and each being characterized by a V-shaped leading edge so that the cutting is achieved from the exterior to the interior of said tube, pairs of rollers cooperating with said knife blades for supporting the ends during cutting, means for rotating each said pair of rollers in opposite direction and at a peripheral speed greater than the speed of its associated knife blade during cutting, said difference in speed being sufficient to urge said ends of the tube toward said knife blades during cutting, and means for reciprocally moving said clamping means toward each other with the cut ends in registry to force the cut ends into abutting engagement and thereby form a splice.

7. Method of joining flexible stock which includes the steps of clamping the ends of the flexible stock to be joined together in spaced relation under a pressure which remains constant during the successive steps and in a manner designed so that the ends project slightly beyond the area of clamping, cutting the projecting ends convexly at a point slightly spaced from the area of clamping, reciprocally moving the cut ends toward each other to bring same into intimate contact, applying pressure to the contacting cut ends to cause them to adhere, and releasing the clamped ends.

8. Apparatus for trimming a piece of flexible stock and splicing the ends together comprising clamping means for holding the two ends of said stock in spaced relation under a constant pressure with the ends projecting slightly from the clamping means, cutting means mounted slightly spaced from said clamping means for reciprocal movement relative to said clamping means and being bow-shaped in the cutting zone to impart to the cut ends a convex configuration, and means for reciprocally moving said cut ends toward each other in registry and for forcing the cut ends into abutting engagement and thereby form a splice.

9. Apparatus for trimming an unvulcanized inner tube and splicing the ends together comprising a pair of clamping means for holding the two flattened ends of said tube in spaced relation under a constant pressure with the ends of the tube projecting slightly from the clamping means, knife blades mounted for reciprocal movement relative to said clamping means and each having a bow-shape in the cutting zone to impart to its respective cut end a convex configuration, means for moving said knife blades so as to provide said reciprocal movement therefor, pairs of rollers jointly displaced with respect to said knife blades in a manner that a roller contacts each said projected end from above and below, means for rotating said rollers in opposite directions at a peripheral speed greater than the speed at which said knife blades are moved during cutting, said difference in speed being sufficient to urge the ends of the tube in the direction of said knife blades during cutting, and means for reciprocally moving said clamping means toward each other with the cut ends in registry to force the cut ends into abutting engagement and thereby form a splice.

10. The method according to claim 2 wherein said cutting is performed in a direction from the exterior toward the interior of the tube ends.

References Cited in the file of this patent
UNITED STATES PATENTS

| | | |
|---|---|---|
| 2,027,854 | Breth et al. | Jan. 14, 1936 |
| 2,550,566 | Iknayan et al. | Apr. 24, 1951 |
| 2,647,555 | Hinman | Aug. 4, 1953 |
| 2,660,216 | Clayton et al. | Nov. 24, 1953 |

FOREIGN PATENTS

| | | |
|---|---|---|
| 108,736 | Australia | Oct. 5, 1939 |

OTHER REFERENCES

Esso Laboratories, "Splicing Problems in the Manufacture of Butyl Inner Tubes"; March 27, 1947, pages relied on are Figure 7 (following page 11) and page 12.